United States Patent
Fujioka et al.

(10) Patent No.: US 8,033,492 B2
(45) Date of Patent: Oct. 11, 2011

(54) FISHING SPINNING REEL

(75) Inventors: Masashi Fujioka, Higashikurume (JP); Wataru Tsutsumi, Tokyo (JP); Takashi Shibata, Higashimurayama (JP); Kyoichi Kaneko, Tokyo (JP)

(73) Assignee: Globeride, Inc., Tokyo (JP)

( * ) Notice: Subject to any disclaimer, the term of this patent is extended or adjusted under 35 U.S.C. 154(b) by 0 days.

(21) Appl. No.: 12/825,804

(22) Filed: Jun. 29, 2010

(65) Prior Publication Data
US 2010/0327097 A1 Dec. 30, 2010

(30) Foreign Application Priority Data

Jun. 29, 2009 (JP) ................. 2009-153739
Jul. 30, 2009 (JP) ................. 2009-178215

(51) Int. Cl.
*A01K 89/01* (2006.01)
(52) U.S. Cl. ....... 242/230; 242/231; 242/232; D22/140; D22/141
(58) Field of Classification Search .............. 242/230, 242/231, 232; D22/140, 141
See application file for complete search history.

(56) References Cited

U.S. PATENT DOCUMENTS

| 4,775,112 | A | * | 10/1988 | Urso | 242/234 |
| 5,312,067 | A | * | 5/1994 | Sugawara et al. | 242/232 |
| 5,605,298 | A | | 2/1997 | Shimozaki et al. | |
| 6,102,314 | A | * | 8/2000 | Marlot et al. | 242/231 |
| 6,929,204 | B2 | * | 8/2005 | Iwabuchi et al. | 242/231 |

FOREIGN PATENT DOCUMENTS
JP 2894422 3/1999
* cited by examiner

*Primary Examiner* — Emmanuel M Marcelo
(74) *Attorney, Agent, or Firm* — Pillsbury Winthrop Shaw Pittman, LLP

(57) ABSTRACT

A fishing spinning reel that includes a rotor having a pair of opposing arms on both sides of a rotor body, wherein one of the pair of arms is provided with, at a forefront end thereof, a supporting member including a fishing line guide; a spool configured to wind up a fishing line through the fishing line guide; and a stiffening member extending from each of fore portions of the pair of the arms towards a rear portion of the rotor body. In one embodiment, the stiffening member is formed to be more spaced apart from the pair of the arms as approaching butt ends of the pair of the arms. In one embodiment, a portion of the stiffening member apart from the pair of arms may be connected to the rotor body.

15 Claims, 23 Drawing Sheets

FISHING SPINNING REEL

CROSS-REFERENCE TO RELATED APPLICATIONS

This application is based upon and claims the benefit of priority from prior Japanese Patent Application Nos. 2009-153739, filed Jun. 29, 2009, and 2009-178215, filed Jul. 30, 2009, the entire contents of which are incorporated herein by reference.

BACKGROUND

The present invention relates to a fishing spinning reel having a rotor that is rotatable in response to a rotating operation of a handle.

A conventional fishing spinning reel comprises a rotor having a line roller, a handle, and a spool for winding up a fishing line. A rotating operation of the handle causes the rotor to rotate and simultaneously causes the spool to reciprocate. The rotor comprises a cylindrical body having a pair of arms on both sides of a rear end of the rotor body. A fishing line is wound up on the reciprocating spool through a line roller disposed on one of the pair of arms.

When the handle rotates in response to a bite, a significant load may be applied to the fishing line and may cause the pair of arms to be deformed in a radially inward direction, which may bring the pair of the arms into abutting contact with an outer periphery of the spool. In addition, when a fishing line is pulled out by performing a drag operation, the deformation of the arms may cause a pulsation of the fishing line, which may prevent a smooth drag operation.

Japanese Patent No. 2,894,422 discloses a fishing spinning reel comprising a belt-like stiffening member that is arranged on a fishing line releasing side to connect the front ends of a pair of arms with a predetermined radial clearance from the outer surface of the rotor.

SUMMARY

Various embodiments of the present invention provides a fishing spinning reel which ensures sufficient mechanical strength of an arm and facilitates weight reduction of a rotor. Another embodiment provides a tangle-proof fishing spinning reel which ensures sufficient mechanical strength of an arm and facilitates weight reduction of a rotor.

Various embodiments disclosed herein relate to a fishing spinning reel comprising a rotor having a pair of opposing arms on both sides of a rotor body, wherein one of the pair of arms is provided with, at a forefront end thereof, a supporting member including a fishing line guide; a spool for, in response to a rotation of the rotor, winding up a fishing line through the fishing line guide; and a stiffening member extending from each of fore portions of the pair of the arms towards a rear portion of the rotor body. In one embodiment, the stiffening member is formed to be more spaced apart from the pair of the arms as approaching butt ends of the pair of the arms. In one embodiment, a portion of the stiffening member apart from the pair of arms may be connected to the rotor body.

In another aspect, various embodiment disclosed herein relate to a fishing spinning reel comprising a rotor having a pair of opposing arms on both sides of a rotor body, wherein one of the pair of arms is provided with, at a forefront end thereof, a supporting member including a fishing line guide; a spool for, in response to a rotation of the rotor, winding up a fishing line through the fishing line guide; and a stiffening member connecting fore portions of the pair of the arms. In one embodiment, the stiffening member is formed to be more spaced apart from the pair of the arms as approaching butt ends of the pair of the arms. In one embodiment, the stiffening member is formed to be curved convexly towards the reel body between the pair of arms.

In another aspect, various embodiment disclosed herein relate to a fishing spinning reel comprising a handle; a rotor body rotatable in response to a rotation of the handle; a pair of arms formed on an outer periphery of the rotor body, each of the pair of arms extending forwardly along a rotation axis of the rotor body; a fishing line guide, provided on one of the pair of arms, for guiding a fishing line to a spool; and a stiffening member that connects fore portions of the pair of arms. In one embodiment, the stiffening member is curved convexly towards the reel body.

According to various embodiments of the present invention, a fishing spinning reel is provided which ensures sufficient mechanical strength of an arm and facilitates weight reduction of a rotor. Furthermore, according to various embodiments of the present invention, a tangle-proof fishing spinning reel is provided which ensures sufficient mechanical strength of an arm and facilitates weight reduction of a rotor.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
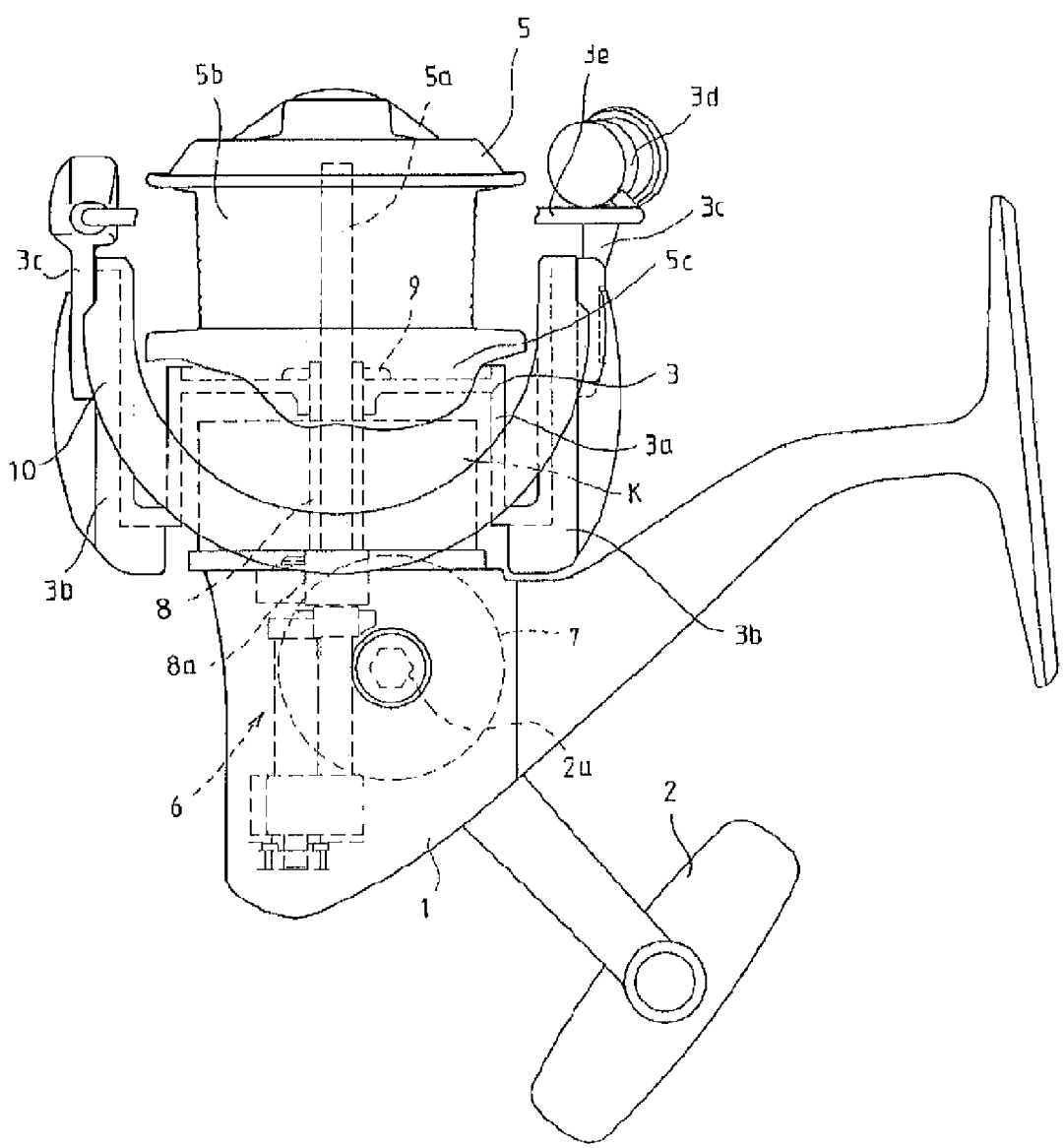
FIG. 1 shows a fishing spinning reel according to one embodiment.
Figure 2:
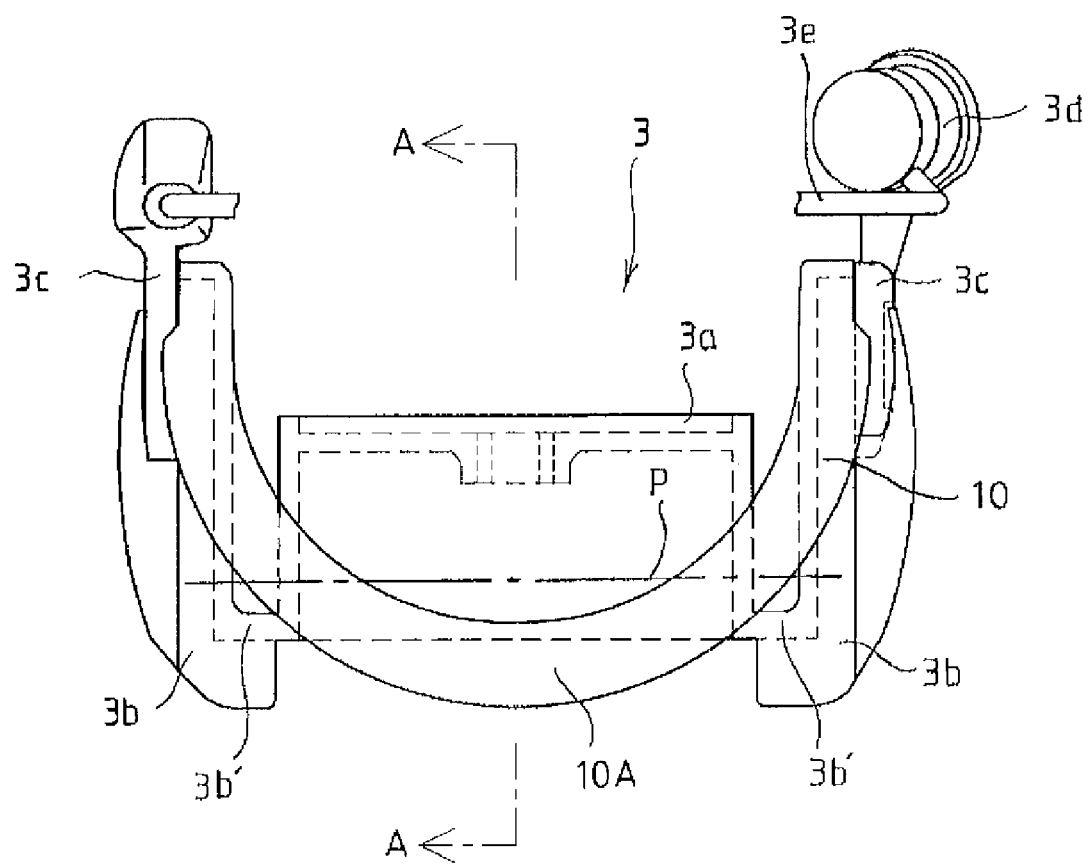
FIG. 2 shows an illustrative embodiment of a rotor provided on the fishing spinning reel of FIG. 1.
Figure 3:
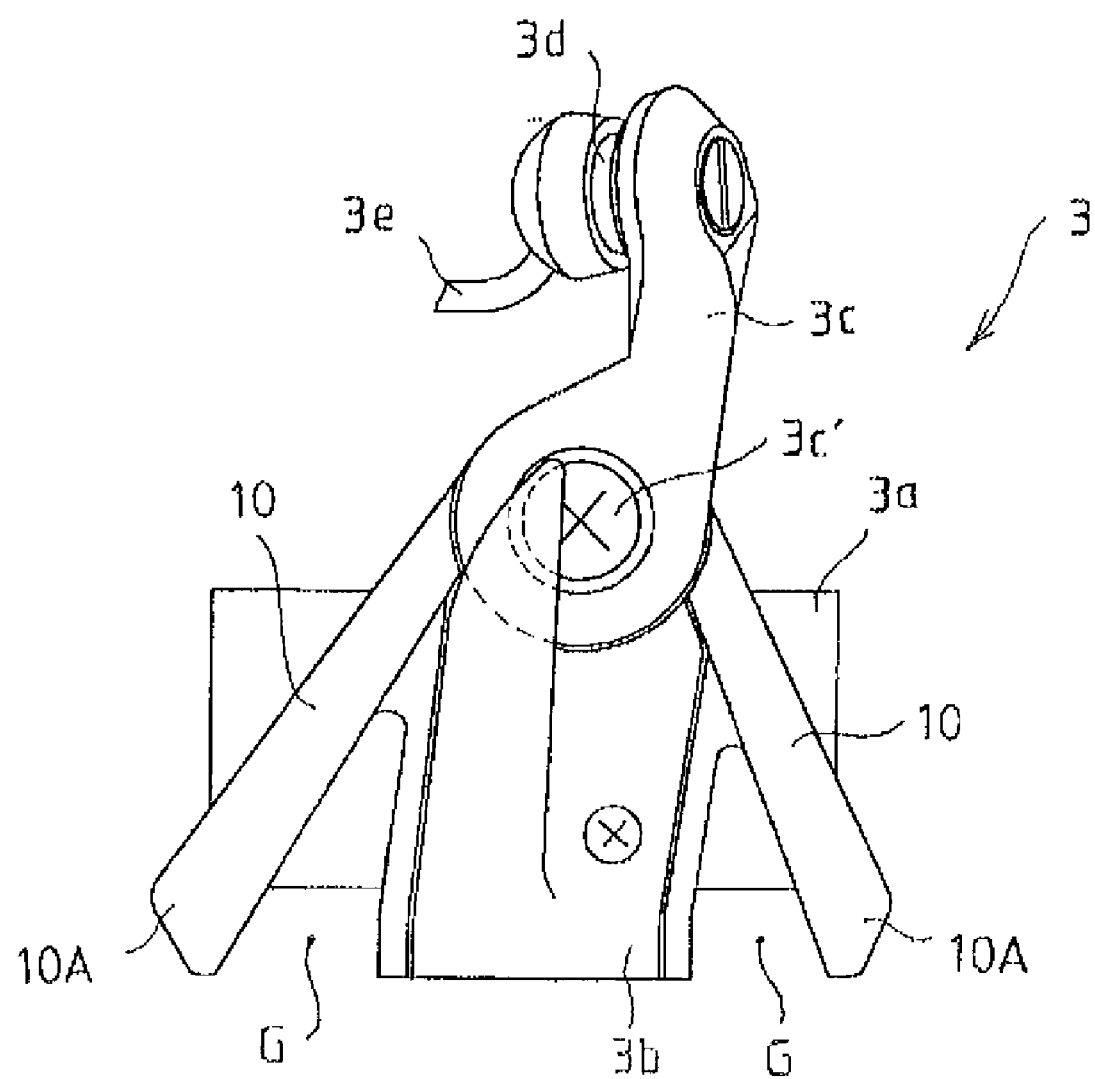
FIG. 3 shows a side view of the rotor in FIG. 2.
Figure 4:
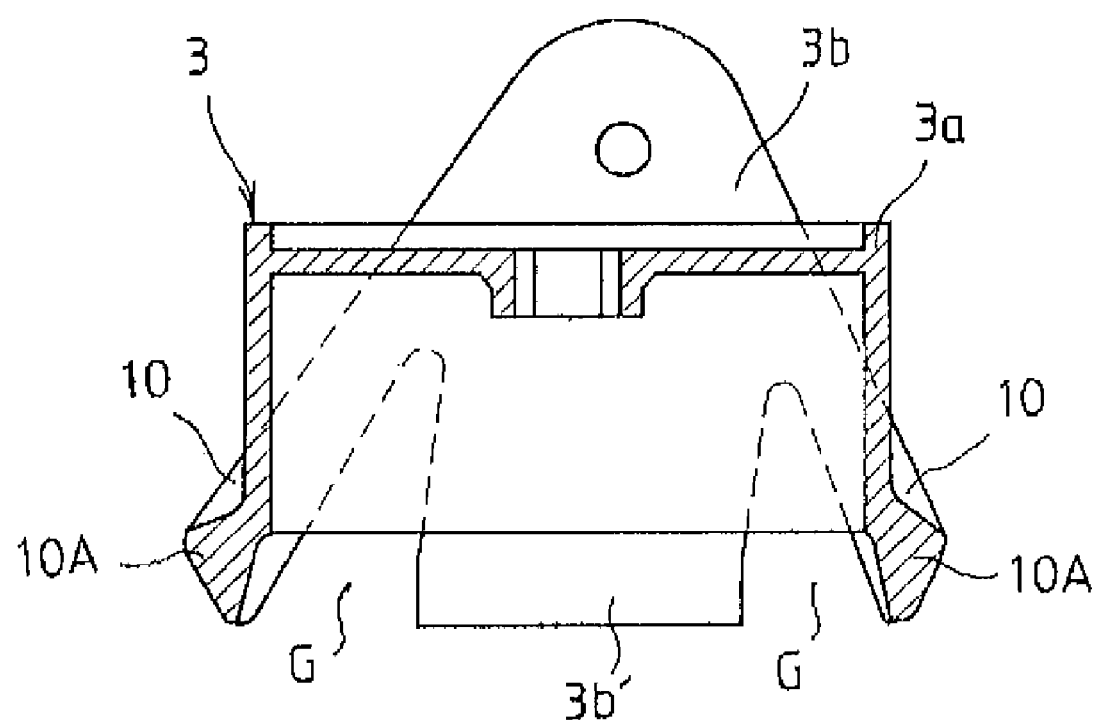
FIG. 4 shows a cross sectional view along line A-A in FIG. 2.
Figure 5:
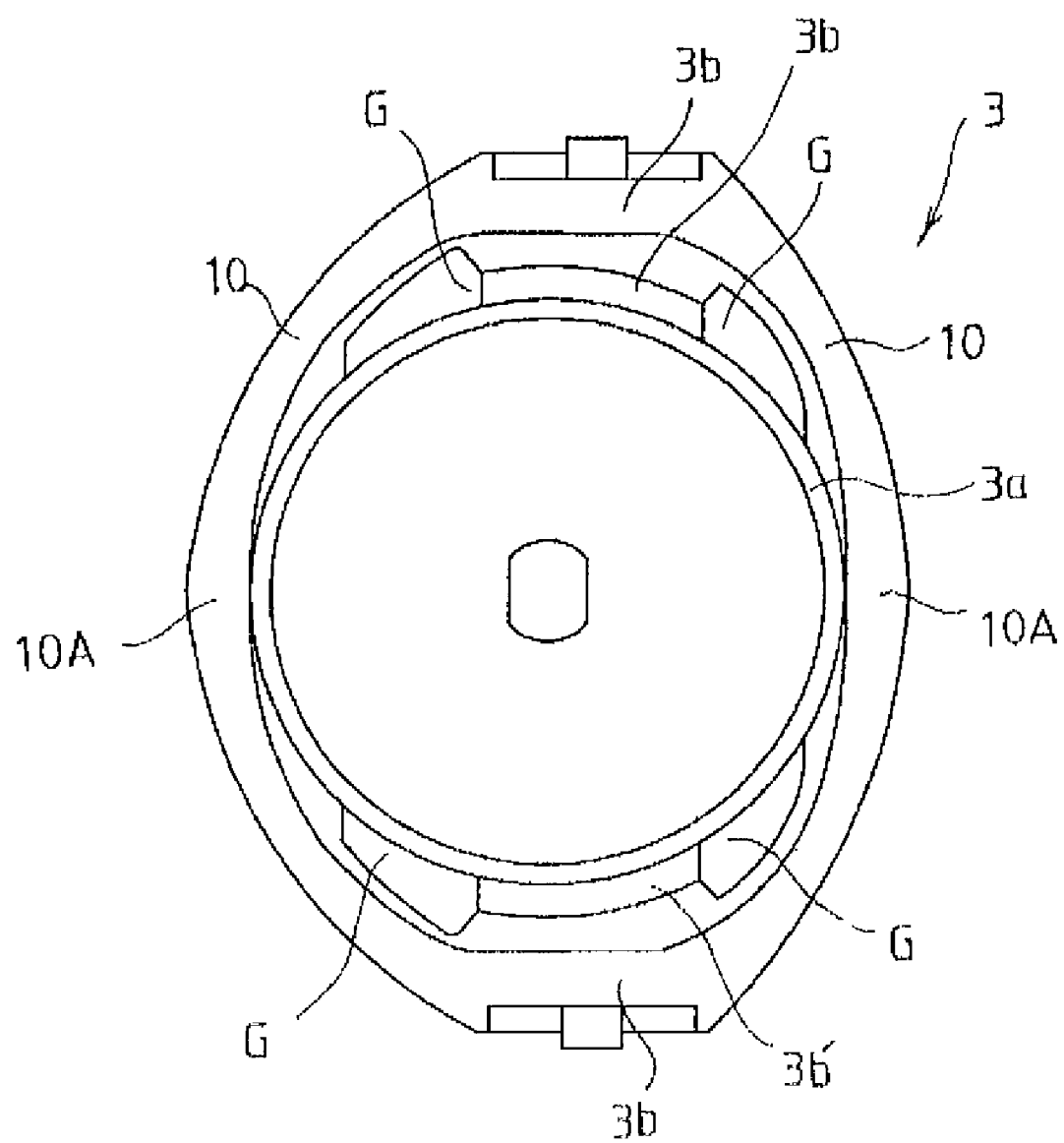
FIG. 5 shows a plain view of the rotor in FIG. 2.

With reference to the drawings, a fishing spinning reel according to various embodiments will be described herein. FIGS. 1-5 depict various embodiments of a fishing spinning reel. FIG. 1 shows a fishing spinning reel according to one embodiment; FIG. 2 shows an illustrative embodiment of a rotor provided on the fishing spinning reel of FIG. 1; FIG. 3 shows a side view of the rotor in FIG. 2; FIG. 4 shows a cross sectional view along line A-A in FIG. 2; and FIG. 5 shows a plain view of the rotor in FIG. 2.

A reel body 1 of a fishing spinning reel according to one embodiment comprises a handle 2 for manual operation; a rotor 3 that is rotatable in response to a rotating operation of the handle 2; and spool 5 which reciprocates in concert with the rotation of the rotor 3.

The handle 2 is attached to a handle shaft 2a which is rotatably mounted inside the reel body 1 via a bearing. Engaged with the handle shaft 2a is a power transmission mechanism 6, which transmits a rotating operation of the handle 2 to the rotor 3 and spool 5.

The power transmission mechanism 6 comprises a driving gear 7 attached to the handle shaft 2a such that the driving gear 7 rotates in concert with a rotation of the handle shaft 2; and a rotating shaft cylinder 8 which extends in an orthogonal direction with respect to the handle shaft 2. The rotating shaft cylinder 8 includes, at its butt end portion, a pinion 8a which gears with the driving gear 7. A rotor nut 9 is threadably attached to the forefront end portion of the rotating shaft cylinder 8 to engage the rotor 3 with the rotating shaft cylinder 8.

Inserted into the rotating shaft cylinder 8 from its forefront end is a spool shaft 5a for holding the spool 5 which is designed to wind up a fishing line. The spool shaft 5a is connected to a known oscillating mechanism which reciprocates the spool shaft 5a along its axis in response to a rotation of the handle shaft 2a caused by a rotating operation of the handle 2.

In this configuration, a rotating operation of the handle 2 causes the rotor 3 to rotate through the driving gear 7 and pinion 8a (rotating shaft cylinder 8) and simultaneously causes the spool 5 to reciprocate back and forth through the oscillating mechanism. As a result, a fishing line is evenly wound up on a spool body 5b of the spool 5 through a fishing line guide arranged on the rotor 3, as described herein below in more detail.

The rotor 3 comprises a cylindrical rotor body 3a and a pair of arms 3b formed on both sides of the rotor body 3a. One of the pair of arms 3b is formed at angular intervals of 180° from the other around the rotation axis of the rotor 3. As shown in FIG. 2, each of the pair of arms 3b comprises a link 3b' which radially outwardly projects from a rear portion of the rotor body 3a (at a reel body side). The link 3b' connects each of the pair of aims 3b to the rotor body 3a. Each of the pair of arms 3b extends forwardly in the axial direction of the rotor 3. As such, there are clearances defined between the rotor body 3a and each of the pair of arms 3b, where a skirt 5c of the spool 5 is disposed as shown in FIG. 1.

Supported at each of the forefront end portions of the pair of arms 3b is a known supporting member 3c which may be swung about a supporting axis 3c' between a fishing line winding position and fishing line releasing position. A line roller 3d (fishing line guide) is mounted at the forefront end portion of one of the supporting members 3c. Provided between the supporting members 3c is a bail 3e which takes up a fishing line and guide it to the line roller 3d in response to the supporting member 3c being swung from the fishing line releasing position to the fishing line winding position. It should be acknowledged that the bail 3e is optional and the reel body 1 can be configured as a bail-less type reel.

A bail retention mechanism (not shown) is arranged inside one of the pair of arms 3b. The bail retention mechanism retains the supporting member 3c selectively at the fishing line winding position or the fishing line releasing position. The pair of arms 3b comprises an inner surface facing to the outer periphery of the rotor body 3a; and an outer surface opposing to said inner. The long sides of the inner and outer surfaces are connected to one another with a pair of narrow lateral surfaces of the arm 3b. The pair of arms 3b is provided with a stiffening member 10.

Now, the stiffening member 10 according to various embodiments will be described in greater detail. As shown in FIG. 3, a pair of stiffening members 10 are arranged on the pair of arms 3b. One of the pair of stiffening members 10 may be arranged at a fore portion of the arm 3b at the side of the handle 2 and extend therefrom towards a rear portion of the rotor body 3a; and the other may be arranged at the fore portion of the arm 3b at the opposite side of the handle 2 and extend therefrom towards a rear portion of the rotor body 3a. In one embodiment, each of the pair of stiffening members 10 may be arranged at a forward position of the arm 3b (i.e., within the range from the center to the forefront edge in the longitudinal direction of the arm 3b) or at substantially the center of the arm 3b in its longitudinal direction. For example, the stiffening member 10 may be connected to the arm 3b in the vicinity of the supporting axis 3c'.

As shown in FIG. 3, the stiffening member 10 may be disposed on each of the lateral surfaces of each of the pair of arms 3b. In one embodiment, the pair of stiffening members 10 are formed in substantially the same shape as one another. The stiffening member 10 may extend from the fore portion of the pair of arms 3b towards a butt ends side of the arms 3b (i.e., towards the link 3b' side) in such a manner to be more spaced apart from the pair of arms 3b as approaching the butt ends, wherein the stiffening member 10 is connected to the rotor body 3a with a portion which is spaced from the pair of arms 3b. Thus, as can be seen in FIG. 3, the stiffening member 10 is formed in a substantial V-shape in side view. As such, a clearance G is defined between the butt ends of the pair of arms 3b and the stiffening member 10. In one embodiment, the stiffening member is formed such that the width of the clearance G becomes larger as approaching the but ends of the pair of arms 3b.

As shown in FIGS. 2 and 4, the stiffening member 10 according to one embodiment connects the front portions of the pair of arms 3b wherein an intermediate portion 10A of the stiffening member 10 is connected to a rear portion of the rotor body 3a. In one embodiment, the stiffening member 10 is formed integrally with the rotor body 3a of the rotor 3. As shown in FIG. 2, the stiffening member 10 may be formed of a single member which is disposed between the pair of arms 3b to one embodiment and convexly curved towards the reel body 3a.

In one embodiment, as shown in FIG. 2, the stiffening member 10 is formed to be curved towards the reel body 3a between the pair of arms 3b such that the lower edge of the stiffening member 10 (i.e., a portion around an intermediate portion 10A) is positioned lower (or more rear) than imaginary line P where the rear edge portion of the skirt 5c is located when the spool moves rearwardly to its rearmost position. In one embodiment, the stiffening member 10 overlaps with a side end part of the rear edge portion of the skirt 5c in such a manner that the spool 5 is easily visible to an angler without being intervened by the stiffening member 10 while the spool 5 reciprocates.

According to various embodiments of the fishing spinning reel as noted above, the stiffening member 10 connects the lateral surfaces of the pair of arms 3b with the rear portion of the rotor body 3a so that the stiffening member 10 can distribute the stress applied by a fishing line to the pair of arms 3b, thereby preventing undesired deformation or damage of the arm 3b.

In addition, as shown in FIGS. 3-5, the stiffening member 10 is formed to be more spaced apart from the pair of arms 3b as approaching the butt ends of the pair of arms 3b and to be curved convexly towards the reel body 1, which gives the pair of arms 3b greater mechanical strength sufficient to prevent deformation of the pair of arms 3b without having to thicken a butt portion of each of the arms 3b. Furthermore, the clearance G may be defined between the stiffening member 10 and the pair of arms 3b. Based on at least the foregoing features, various embodiments of the fishing spinning reel facilitate weight reduction while ensuring a satisfactory mechanical strength of the pair of arms 3b.

According to one embodiment, the stiffening member 10 is connected between the pair of arms 3b in such a manner that the stiffening member 10 is formed to be curved convexly towards the reel body 1 and a part of the stiffening member 10 is connected to a rear portion of the rotor body 3a. This configuration allows the stiffening member 10 to mechanically reinforce the pair of arms 3b by distributing the stress radially applied to the pair of arms 3b to prevent stress concentration. In addition, the stiffening member 10 according to one embodiment is arranged on both edge portions in the cross direction of the pair of arms 3b (i.e., on the opposing lateral surfaces of the arm 3b) and, therefore, facilitates mechanical reinforcement of the pair of arms 3b and balanced rotation of the rotor 3.

Moreover, the pair of stiffening members 10 are arranged on the opposing lateral surfaces of each of the pair of arms in such a manner that each of the pair of stiffening members 10 becomes more spaced apart from one another as approaching the butt ends of the pair of arms 3b to form a substantial V-shape in side view, as shown in FIG. 3, where each of the forefront portion of the pair of the arms 3b is formed of tapered shapes to provide a smooth junction between the stiffening member 10 and corresponding arm 3b, whereby a tangled or twisted fishing line on the arms 3b is allowed to easily slip forwardly off the arms 3b. In addition, the curved stiffening member 10 can provide improved ornamental appearance of the rotor 3 by extending up to the area below the lower edge of the skirt 5c.

Figure 6:
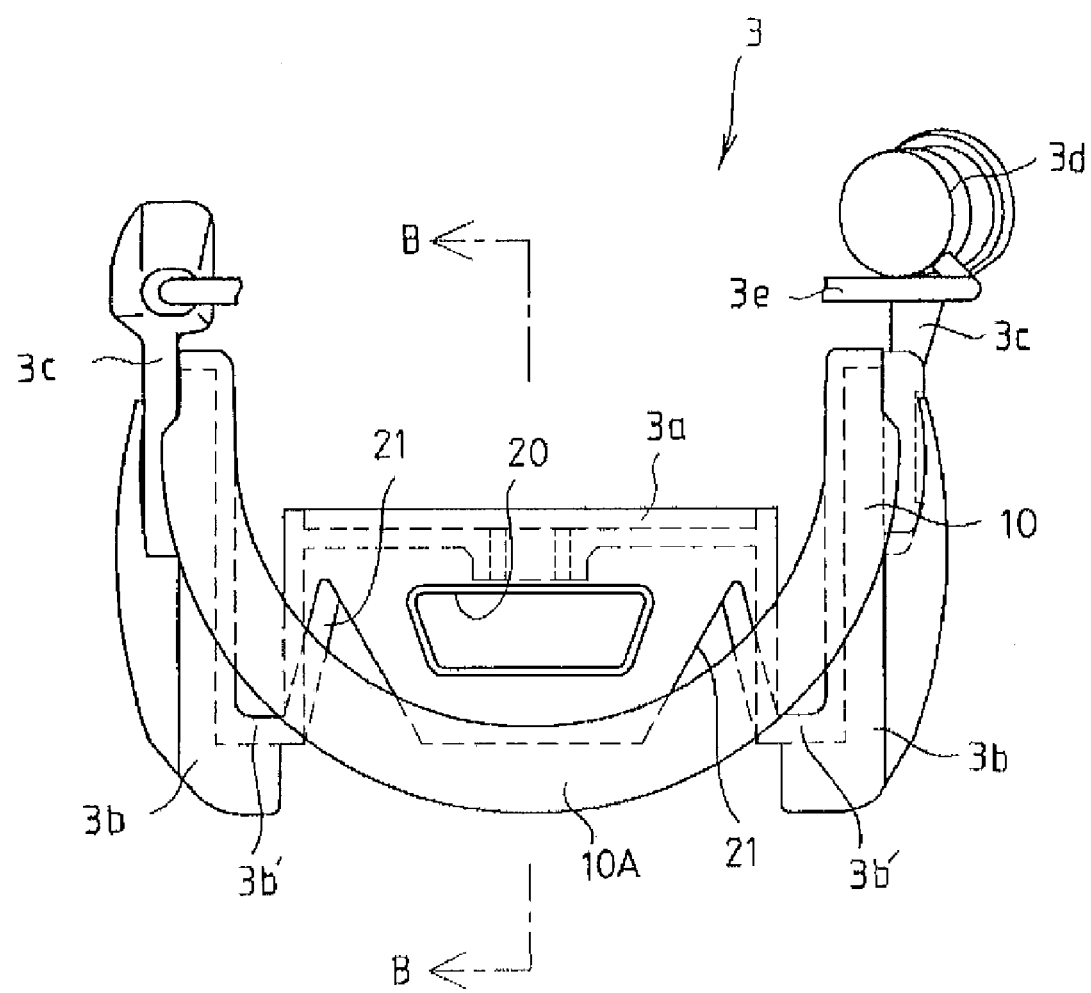
FIG. 6 shows a fishing spinning reel according to one embodiment.
Figure 7:
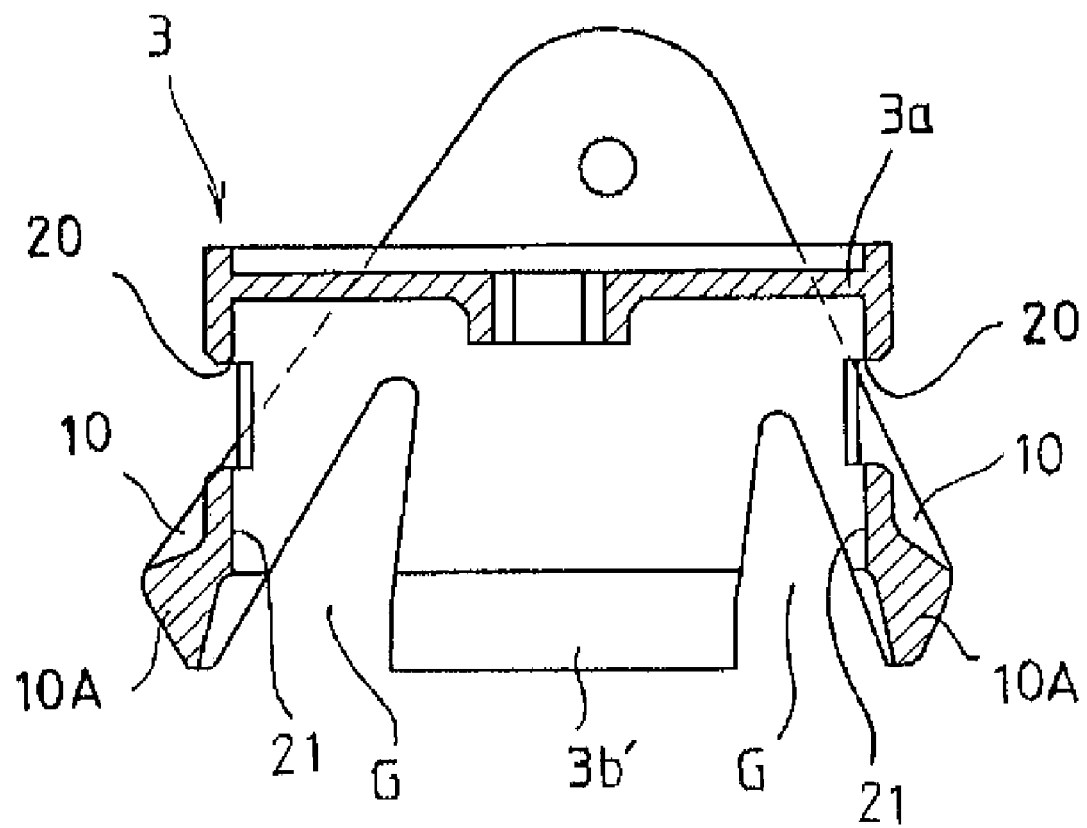
FIG. 7 shows a cross sectional view along line B-B in FIG. 6
Figure 8:
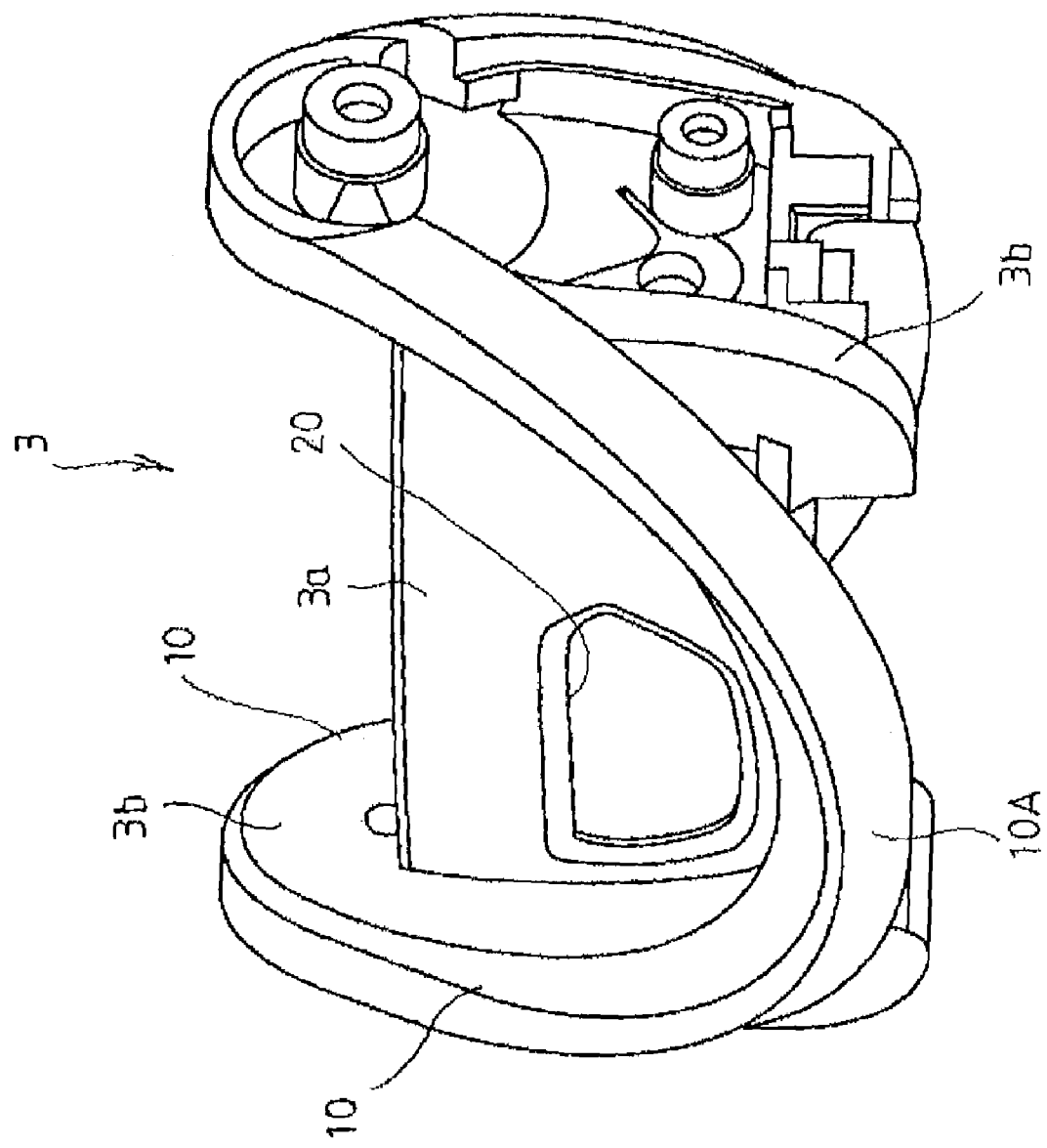
FIG. 8 shows a perspective view of an illustrative embodiment of a major part of the rotor in FIG. 6.

Next, another embodiment will be explained with reference to FIGS. 6-8. In these drawings, similar symbols identify similar components, unless context dictates otherwise. FIG. 6 shows fishing spinning reel according to another embodiment; FIG. 7 shows a cross sectional view along line B-B in FIG. 6; and FIG. 8 shows a perspective view of an illustrative embodiment of a major part of the rotor in FIG. 6 with an arm cover detached.

In one aspect, an aperture 20 and a pair of notches 21 are formed on the rotor body 3a of the rotor 3. The aperture 20 is formed in a substantially rectangular shape on the outer periphery of the rotor body 3a at angular intervals of 90° from the positions where the arms 3b are provided. On the both sides of the aperture 20, a pair of substantially triangular notches 21 are formed. As such and as can be seen in FIG. 7, the aperture 20 and the pair of notches 21 are formed at positions remote from the pair of arms 3b to maintain mechanical strength of the pair of arms 3b. An intermediate portion 10A of the stiffening member 10 is integrally connected proximal to the lower edge of the aperture 20.

Thus, the stiffening member 10 is connected between the pair of arms 3b in such a manner that the stiffening member 10 is f curved convexly towards the reel body 1. This configuration facilitates improvement of mechanical strength of the pair of arms 3b as well as weight reduction of the rotor 3 by virtue of some clearances formed or defined on the rotor body 3a. The aperture 20 and notches 21 may be modified in, for example, shape, configuration or arrangement. The shape, configuration or arrangement of the aperture 20 or notches 21 may be modified or changed for better ornamental effect to one embodiment, the rotor body 3a may be provided with only one of the aperture 20 or notches 21. As shown in FIG. 1, a waterproof cap K may be mounted at a fore portion inside the rotor body 3a, which prevents water from entering the interior of the reel body 3, in particular, a bearing or backstop mechanism arranged between the fore portion of the reel body 1 and the rotating shaft cylinder 8.

Figure 9:
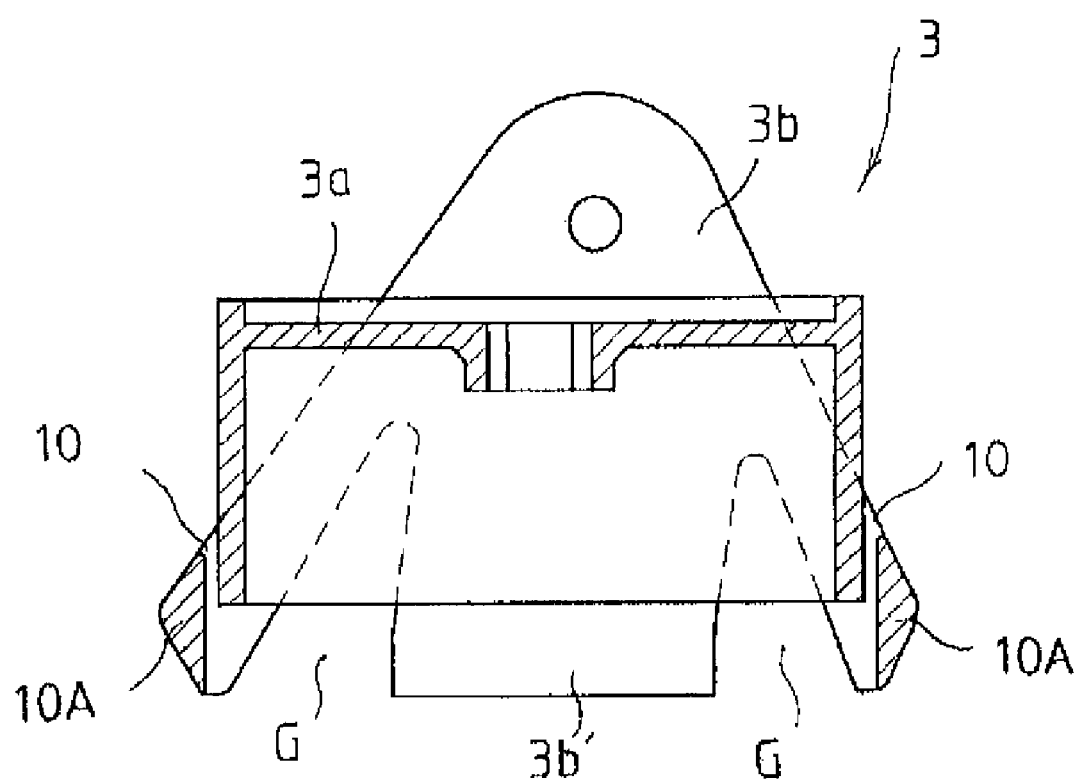
FIG. 9 shows a cross sectional view of a rotor according to one embodiment.
Figure 10:
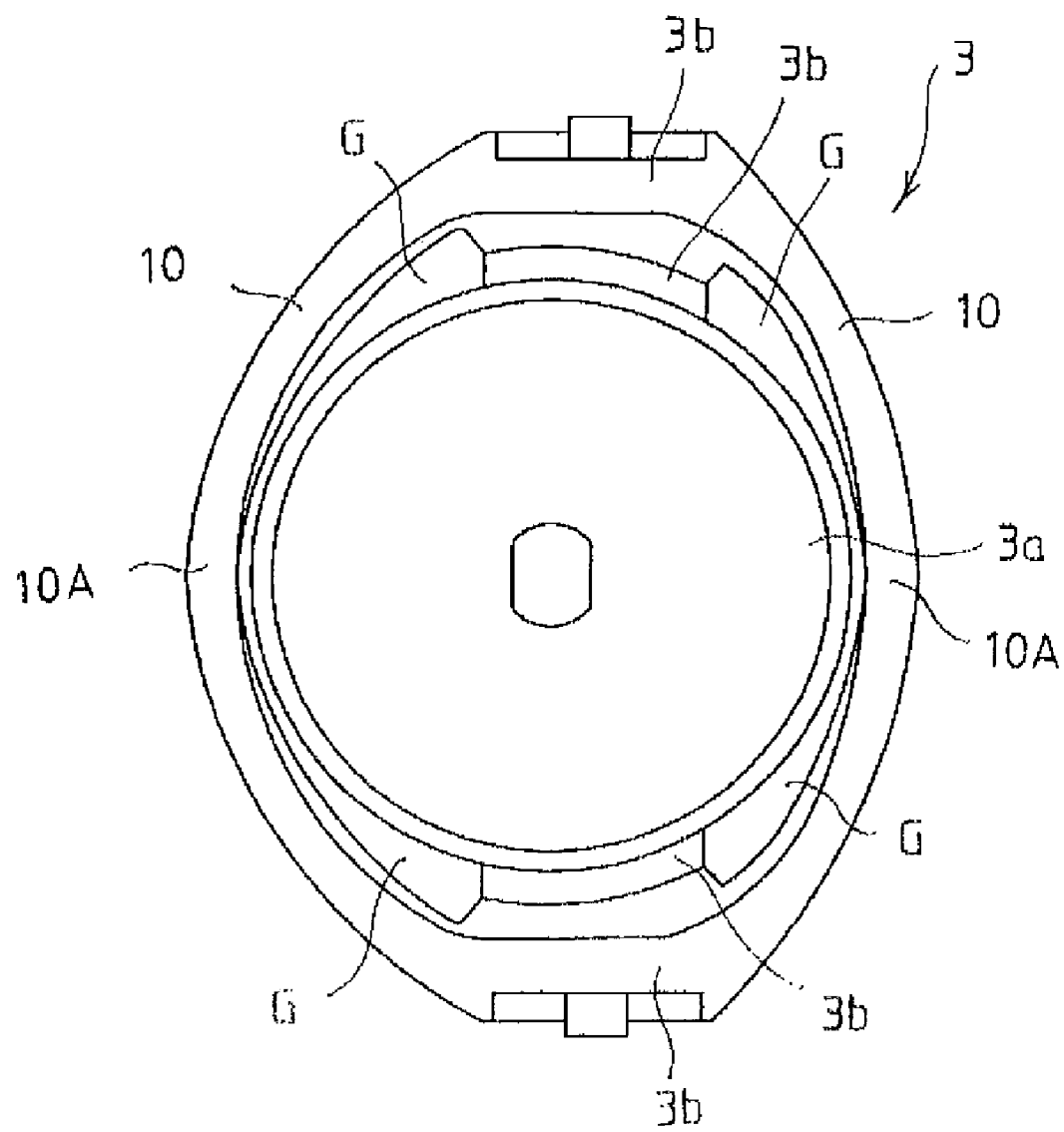
FIG. 10 shows a plain view of the rotor in FIG. 9.

Now, with reference to FIGS. 9 and 10, another embodiment of a fishing spinning reel will be described in detail. FIG. 9 shows a cross sectional view of a fishing spinning reel according to one embodiment; and FIG. 10 shows a plain view of the rotor in FIG. 9. In one embodiment, the stiffening member 10 may be connected between the pair of arms 3b without being connected to a rear portion of the rotor body 3a. The rotor body according to this embodiment may also include at least one of the aperture 20 or notches 21. In this configuration, the stiffening member 10 can reinforce mechanical strength of the pair of arms 3b by distributing an stress radially applied to the pair of arms 3b.

Next, with reference to FIGS. 13-18, another embodiment of a fishing spinning reel will be described. As shown in these drawings, the fishing spinning reel according to various embodiments may include a cap 30 for covering clearance G.

Figure 13:
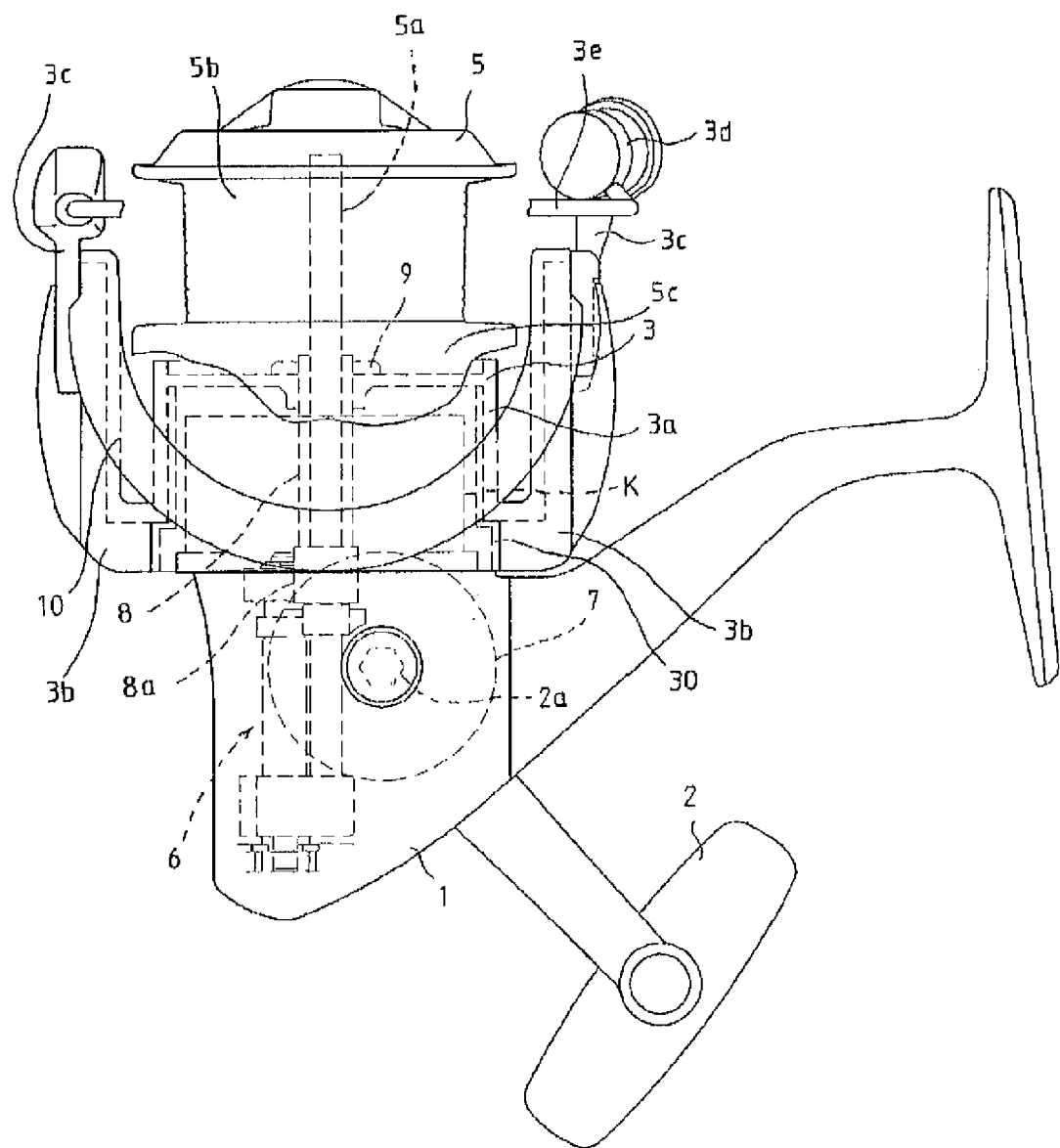
FIG. 13 shows a fishing spinning reel according to one embodiment.
Figure 14:
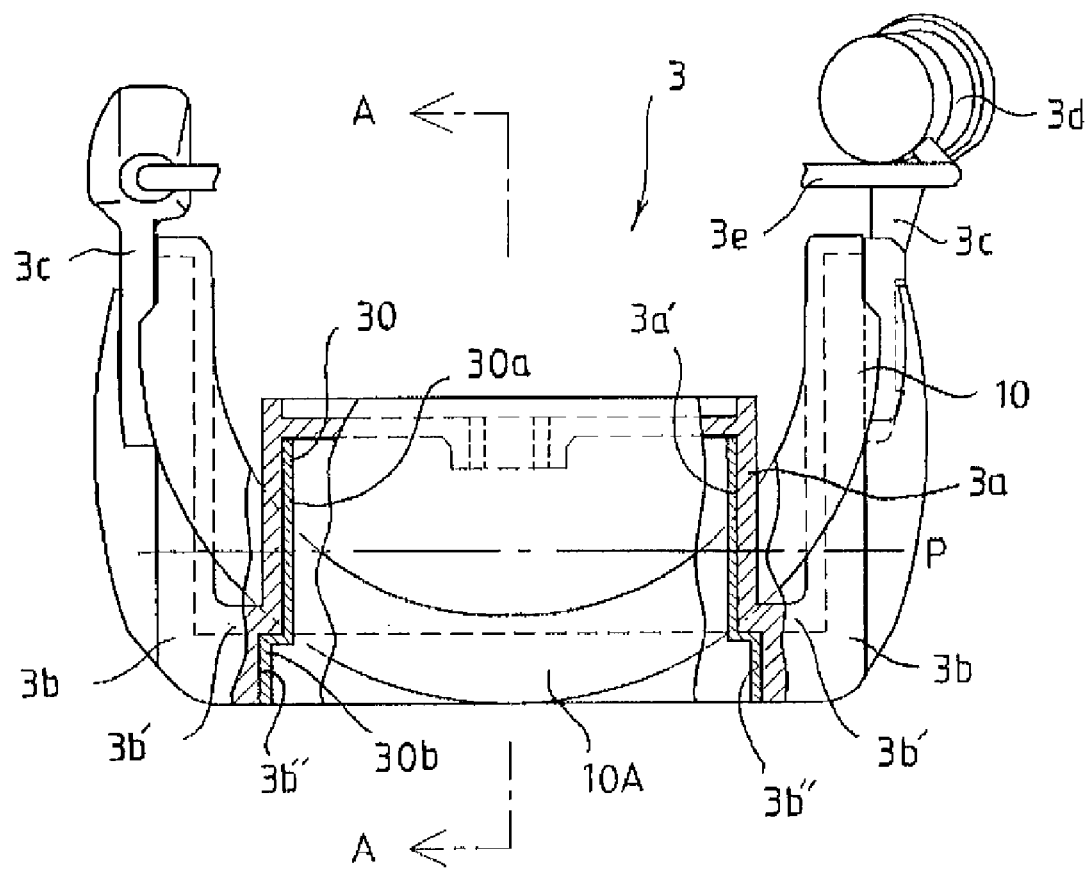
FIG. 14 show an illustrative embodiment of the rotor provided on the fishing spinning reel in FIG. 13.
Figure 15:
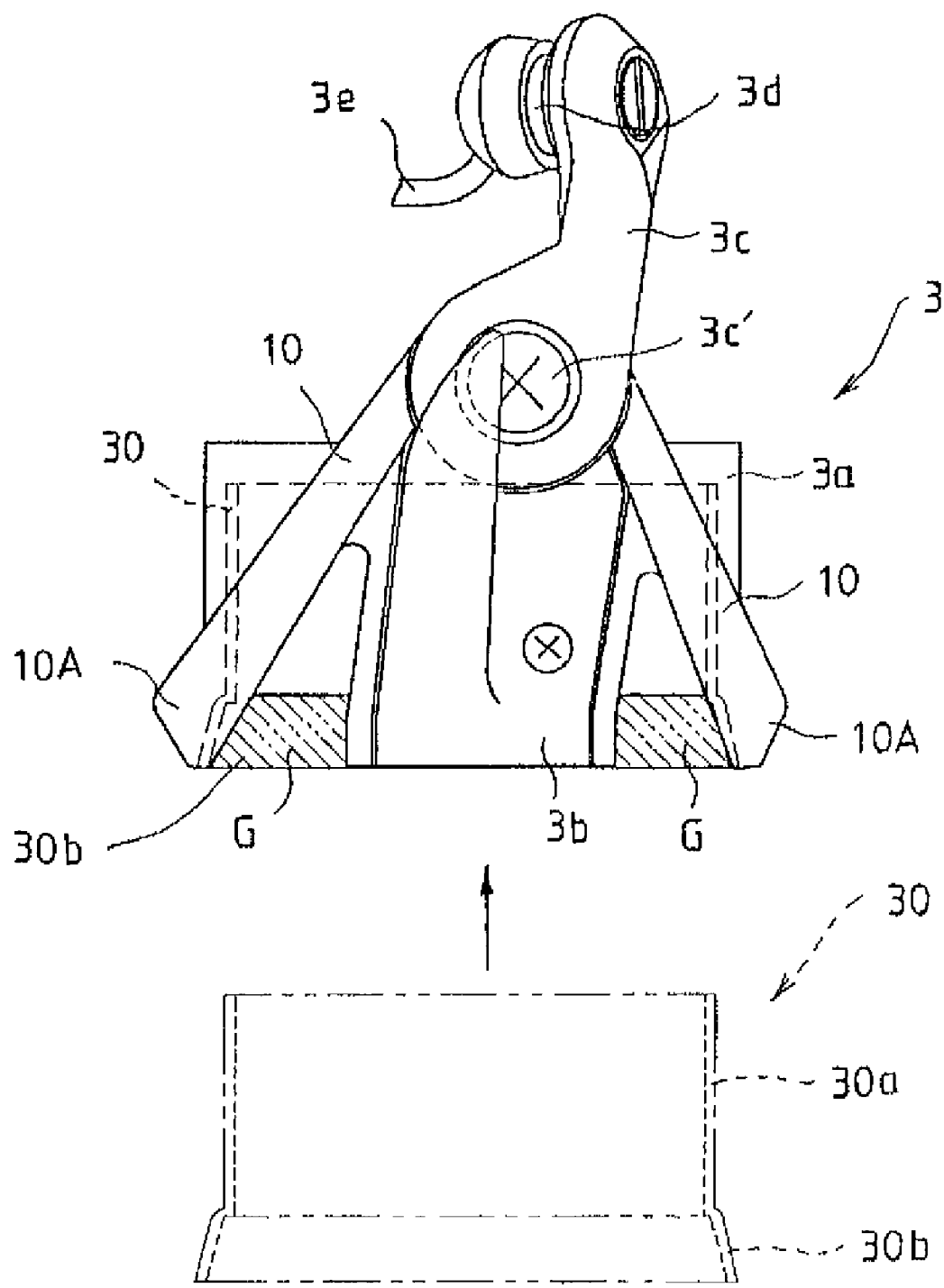
FIG. 15 shows a side view of the rotor in FIG. 14.
Figure 16:
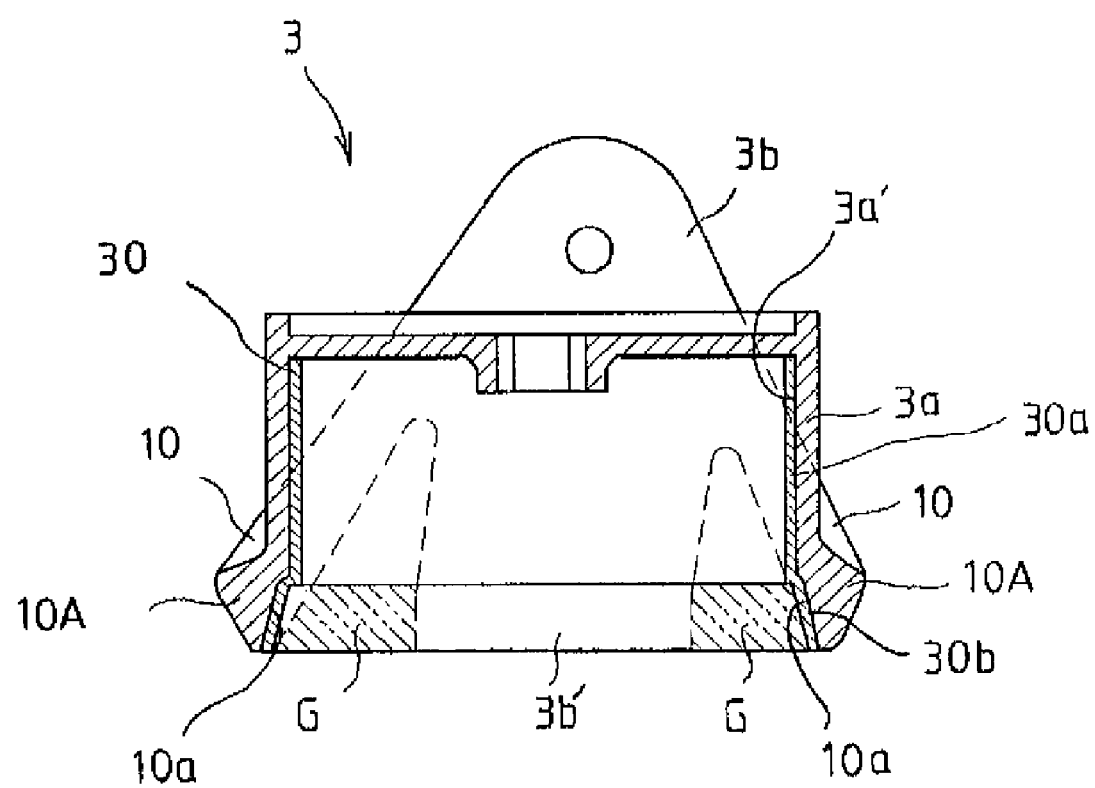
FIG. 16 shows a cross sectional view along line A-A in FIG. 14.
Figure 17:
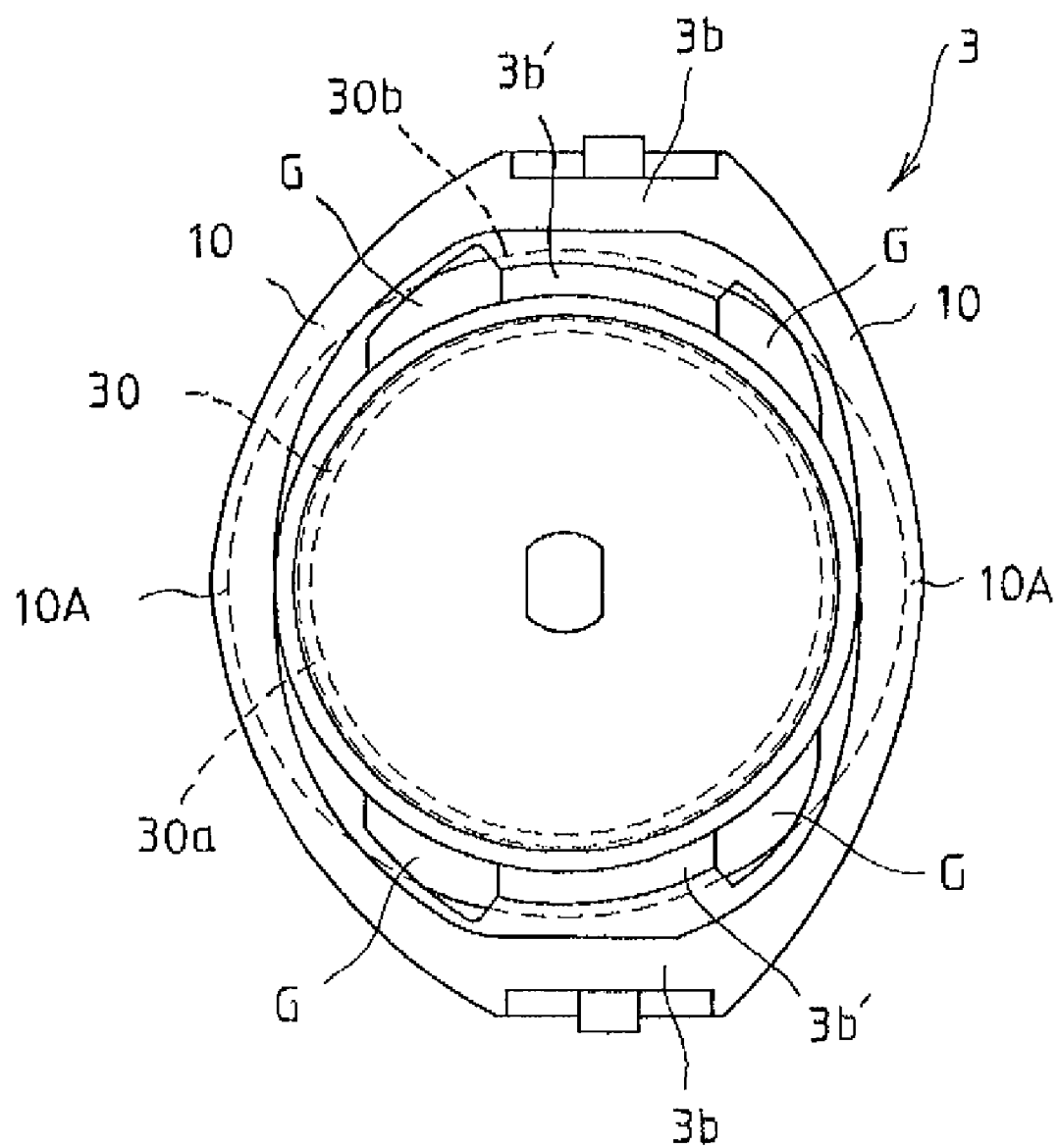
FIG. 17 shows a plain view of the rotor in FIG. 14.
Figure 18:
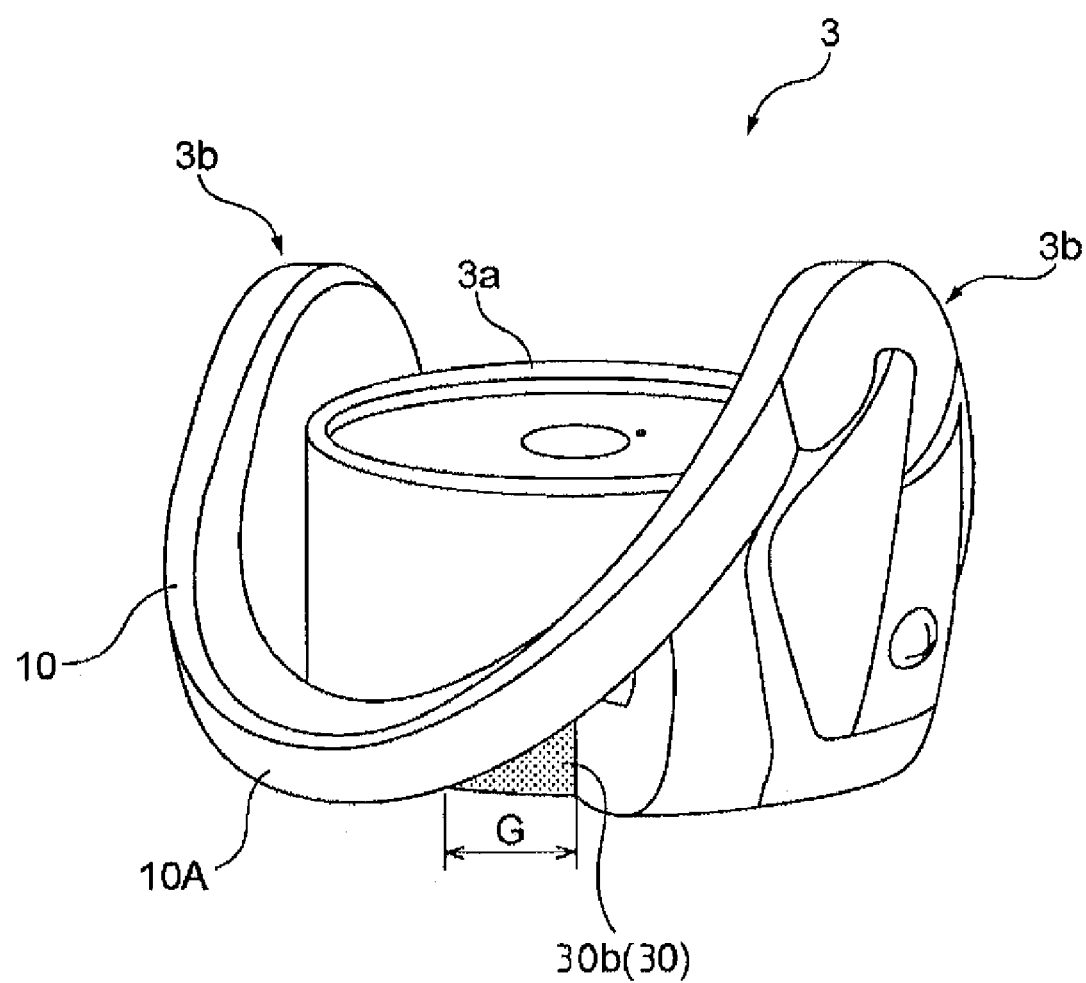
FIG. 18 shows a perspective view of an illustrative embodiment of a major part of the rotor in FIG. 14.

FIGS. 13-18 depicts illustrative embodiments of a fishing spinning reel. In particular, FIG. 13 shows a fishing spinning reel according to one embodiment; FIG. 14 show an illustrative embodiment of the rotor provided on the fishing spinning reel in FIG. 13; FIG. 15 shows a side view of the rotor in FIG. 14; FIG. 16 shows a cross sectional view along line A-A in FIG. 14; FIG. 17 shows a plain view of an illustrative embodiment of the rotor in FIG. 14; and FIG. 18 shows a perspective view of an illustrative embodiment of a major part of the rotor in FIG. 14.

As shown in FIG. 15, a clearance G is formed to become wider as approaching the butt ends of the pair of arms 3b. In this configuration, a fishing line may be rearwardly released from the line roller 3d due to a tension change or twist of a fishing line during a winding operation. To prevent such a fishing line from entering and tangling with the clearance G, a covering member as described hereinafter may be used to cover the clearance G.

According to one embodiment, a rotor 3 may be provided with a cap 30 for covering the clearance G defined between the both sides of the butt ends of the pair of arms 3b and the stiffening member 10. The cap 30 may be formed to prevent a fishing line from entering the clearance G (which is shown in two-dot chain line) and from tangling with the stiffening member 10. The cap 30 may be formed of a collar-like or cylindrical member which may be formed separately from the rotor 3 and fitted inside the rotor body 3a. The cap 30 may be formed integrally with the rotor 3.

The shape of the cap 30 is determined based on the shapes of the rotor body 3a and the link 3b' radially projecting from the rotor body 3a. For example, the cap 30 according to one embodiment comprises a first circular cylinder 20a and second circular cylinder 20b. The first circular cylinder 20a may be closely fitted on the inner periphery of the rotor body 3a; and the second circular cylinder 20b may be closely fitted on an inner side surface 3b" which is formed on the link 3b' at its radially internal side. The second circular cylinder 20b is formed to have a larger diameter than that of the first circular cylinder 20a.

In FIG. 15, an arrow indicates that the cap 30 may be fitted or inserted with force into the rotor body 3a. The cap 30 may be mounted on the rotor 3 by, for example, bonding the first circular cylinder 20a with the inner periphery surface 3a' of the rotor body 3a and by bonding a part of the periphery of the second circular cylinder 20b with the inner side surface 3b" of the link 3b' (as shown in FIG. 2). As such, the second circular cylinder 20b of the cap 30 covers the area defined by the two-dot chain line in FIGS. 3 and 4 and, therefore, can prevent a fishing line from entering this area and tangling with the stiffening member 10.

The second circular cylinder 20b may come into abutting contact with the inner periphery 10a of the stiffening member 10 without bonding. It would also be possible to bond a part of the periphery of the second circular cylinder 20b with the internal side surface 10a periphery of the stiffening member 10. Furthermore, the cap 30 may be elastically engaged with the inner periphery surface 3a' or inner side surface 3b".

As noted above, the rotor 3 comprises the cap 30 which can cover the clearance G defined between the both sides of the butt ends of the pair of arms 3b and stiffening member 10, it is possible to prevent a fishing line from tangling with the stiffening member 10 even if a fishing line is backwardly released due to a twist or sag of a fishing line. Moreover, since tangling of a fishing line with the stiffening member 10 may be prevented during a fishing line winding operation, an angler may wind up a fishing line without trouble.

The above cap 30 may be formed of a material having lower specific gravity than rotor 3. In one embodiment, the cap 30 may be formed of a resin while the rotor is made of aluminum, thereby reducing the entire weight of the rotor 3. The cap 30 may be bonded or threadingly fixed with rotor 3.

Additionally or alternatively, as shown in FIG. 1, the rotor 3 may comprise a waterproof cap K mounted on a fore portion of the reel body 1 which is disposed inside the rotor body 3a in order to waterproof a bearing or backstop mechanism which is arranged between the front portion of the reel body 1 and the rotating shaft cylinder 8.

Figure 19:
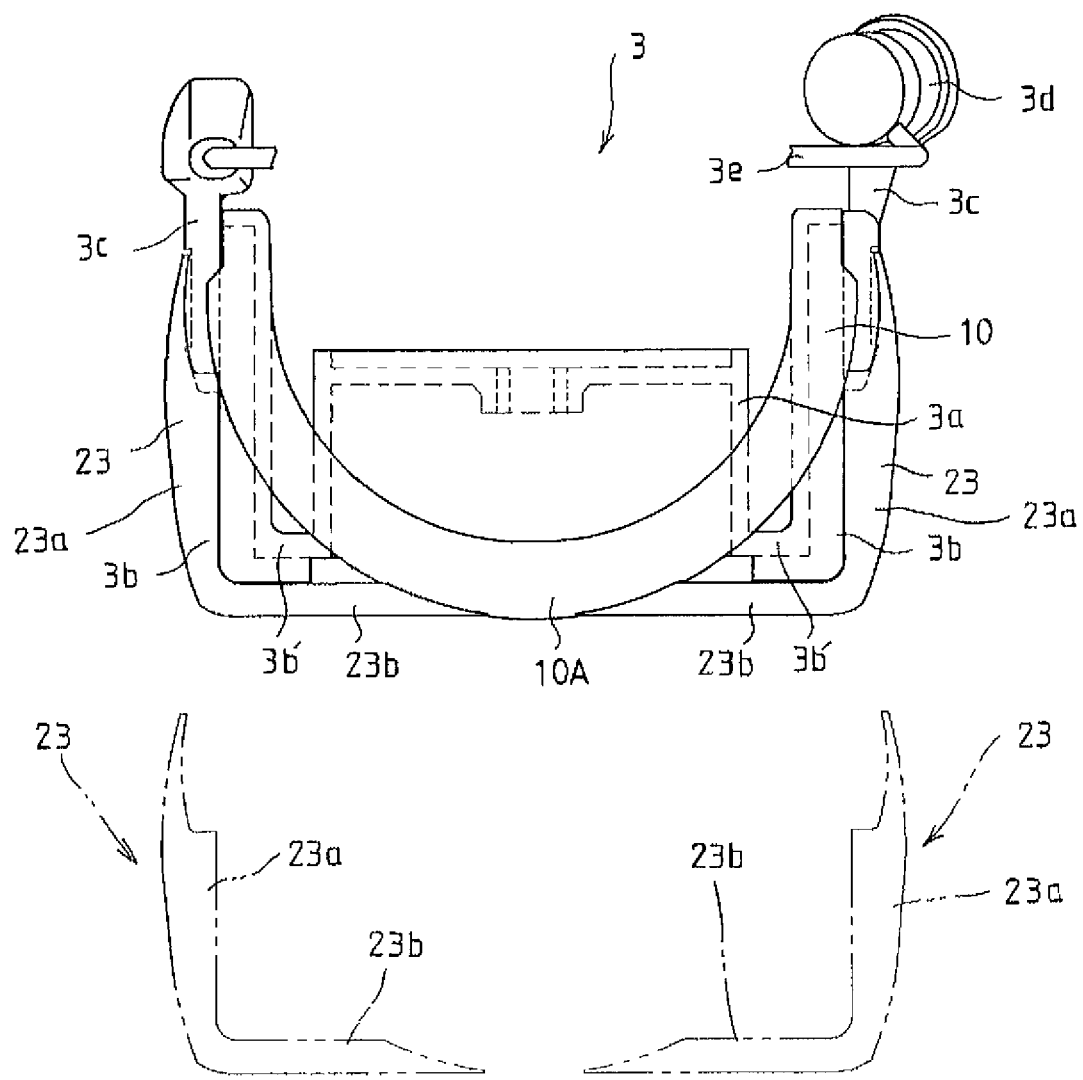
FIG. 19 shows a fishing spinning reel according to one embodiment.
Figure 20:
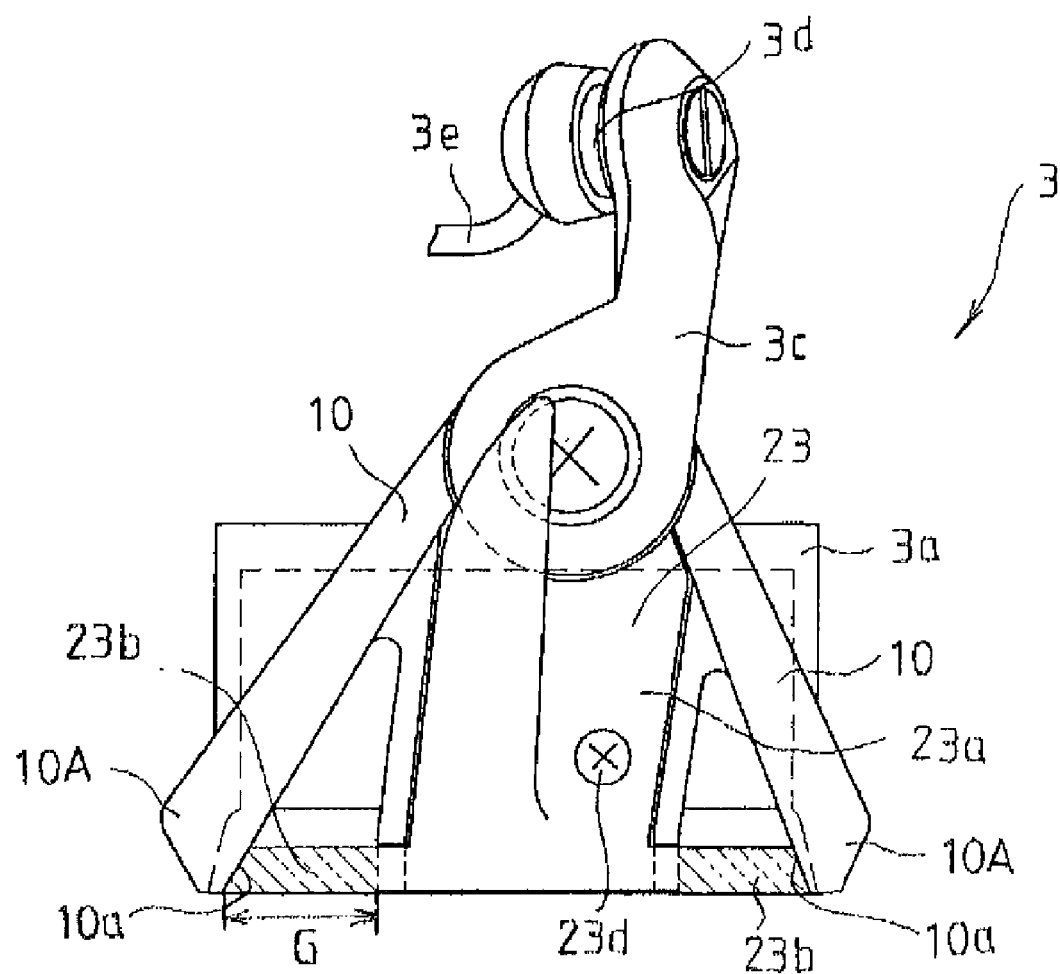
FIG. 20 shows a side view of the rotor in FIG. 19.
Figure 21:
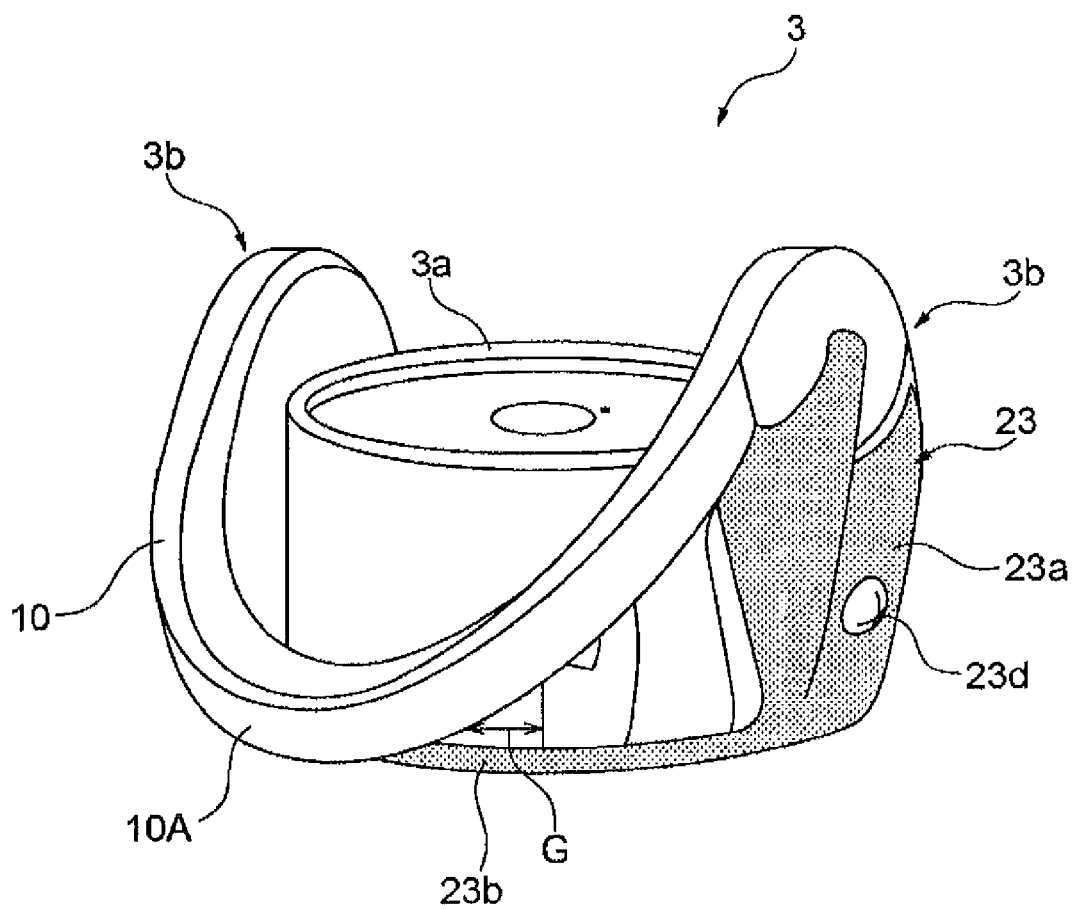
FIG. 21 show a perspective view of the rotor in FIG. 19.

FIGS. 19-21 depicts an illustrative embodiment of a fishing spinning reel. In particular, FIG. 19 shows a fishing spinning reel according to one embodiment; FIG. 20 shows a side view of an illustrative embodiment of the rotor in FIG. 19; and FIG. 21 show a perspective view of an illustrative embodiment of the rotor in FIG. 19.

As shown in these drawings, a fishing spinning reel according to one embodiment comprises a cover 23 for covering the surfaces of each of the pair of arms 3b. The cover 23 is formed to also cover clearance G defined between the butt ends of the pair of arms 3b and the stiffening member 10. Thus, covers for the pair of arms 3b and clearance G are integrally configured.

In one embodiment, each of the pair of arms 3b may contain an inversion mechanism for a bail. The cover 23 is formed and arranged in such manner to cover the inversion mechanism mounted in the pair of the arms 3b. The cover 23 comprises a cover portion 23a for covering the pair of arms 3b, and a pair of arms 23b each extending from a rear edge of the cover portion 23a in both directions in the circumferential direction of the rotor 3. It should be understood that FIG. 21 shows only one of the pair of arms 23b. The pair of arms 23b may cover clearance G, which is defined by the two-dot chain line in FIG. 20, and, therefore, can prevent a fishing line from entering the clearance G and tangling with the stiffening member 10.

The front edge of the arm 23b may come into abutting contact with the internal periphery 10a of the intermediate portion 10A by threadingly engaging cover 23 with the pair of arms 3b by use of screw 23d. In one embodiment, an inversion mechanism for a bail may be contained in one of the pair of arms 3b so that the other of the pair of arms 23b can be bonded with stiffening member 10. In this configuration, since the cover 23 is formed integrally with elements of the rotor 3, reduction in the number of parts can be achieved.

Figure 11:
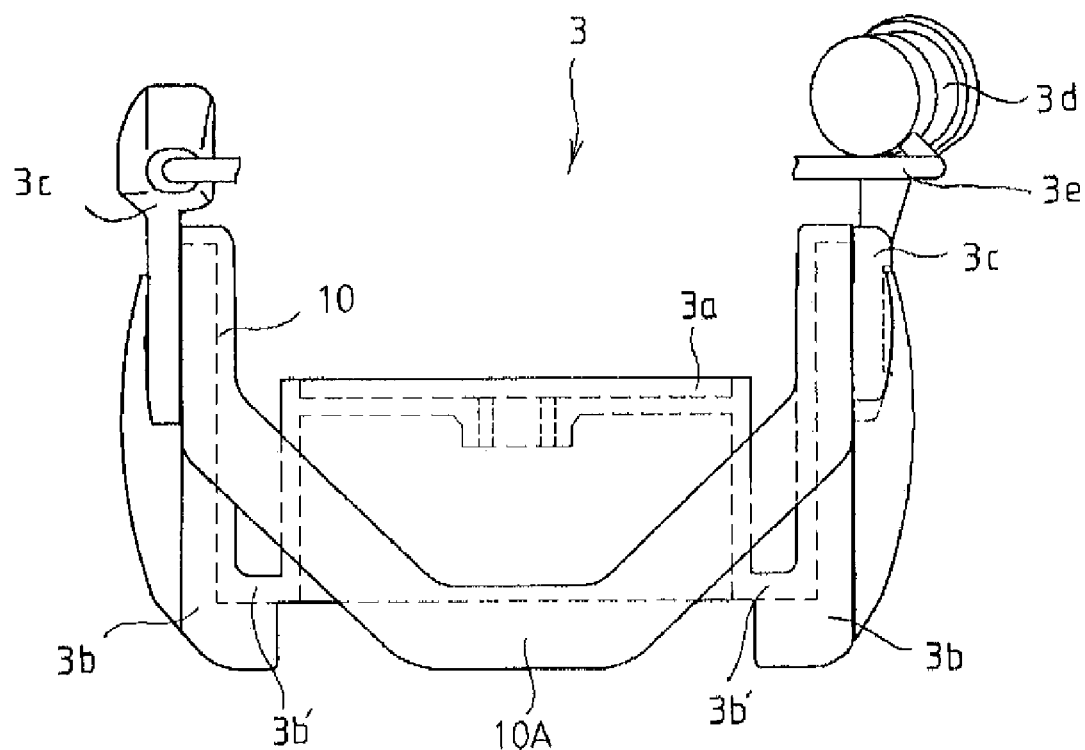
FIG. 11 show a rotor according to one embodiment.
Figure 12:
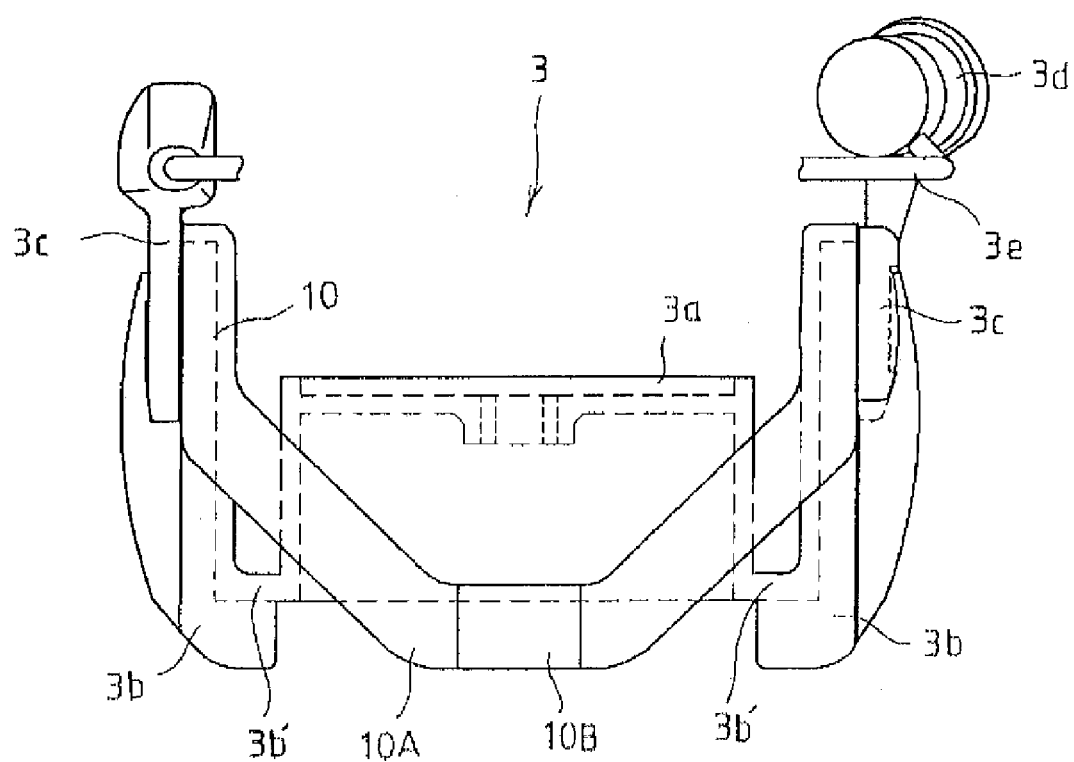
FIG. 12 show a rotor according to one embodiment.
Figure 22:
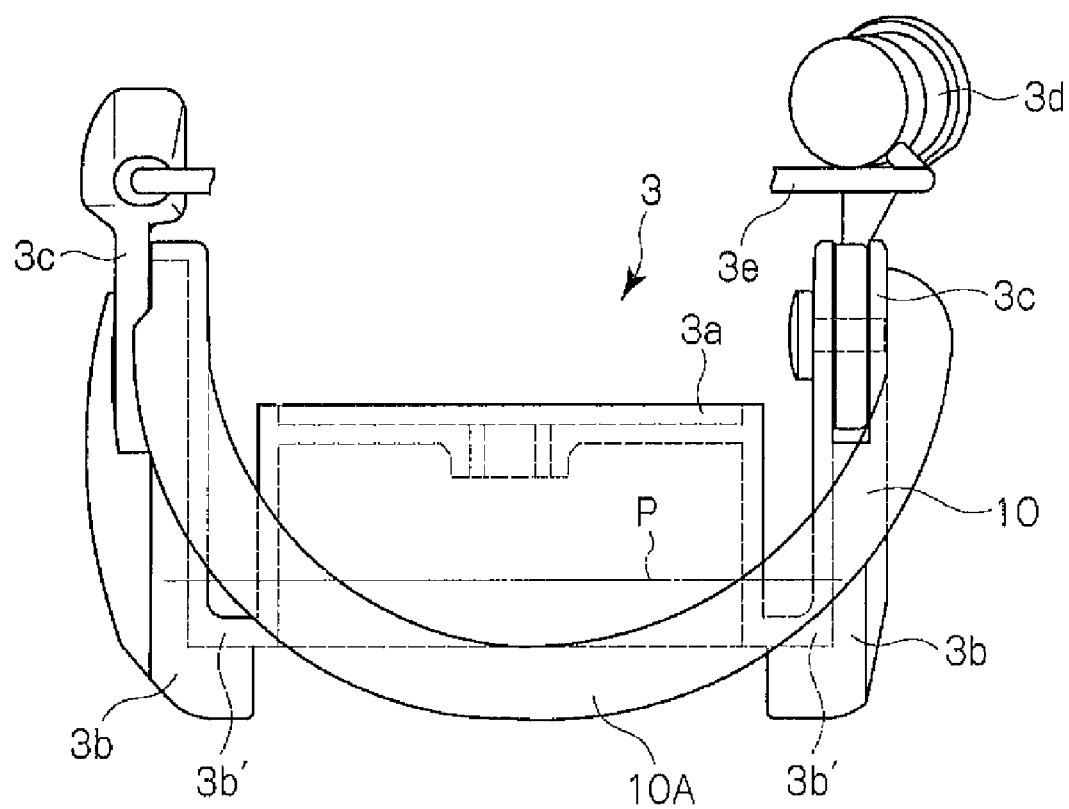
FIG. 22 shows an illustrative embodiment of a rotor according to one embodiment.
Figure 23:
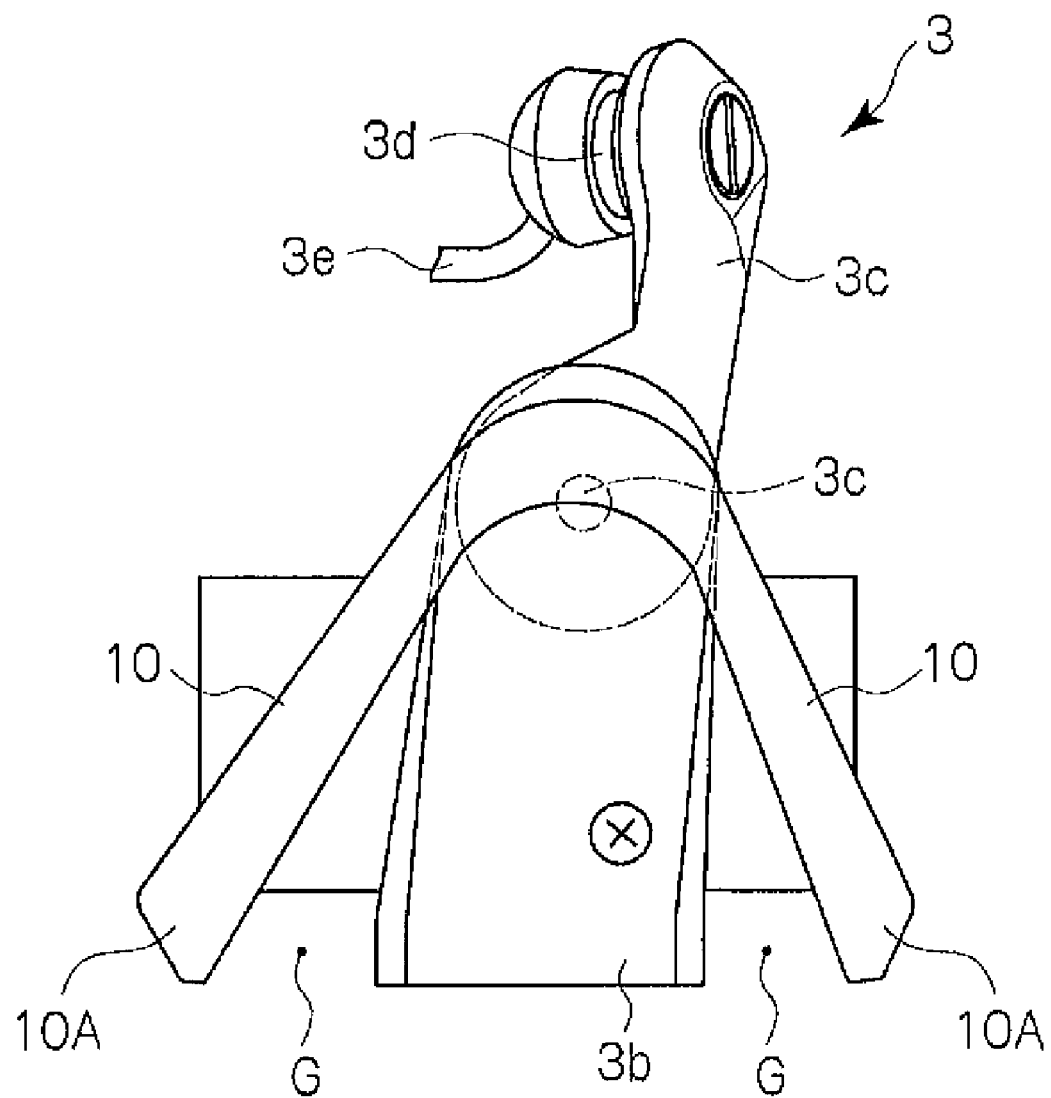
FIG. 23 shows a side view of the rotor in FIG. 22.

Although various embodiments are described herein, they are purely for purpose of illustration and various changes and modifications may be made to this disclosure without departing from the scope or spirit of the inventive concept described herein. In particular, stiffening member 10 may not be limited to the above described embodiment, and various modifications in, for example, its shape, configuration or arrangement can be made. For example, stiffening member 10 may be formed to have portions which linearly extend towards the rotor body 3a which form a substantial V-shape, as shown in FIG. 11. Additionally or alternatively, the stiffening member 10 may be formed to include a thick portion 10b around the center portion and may connect the center portion with the rear portion of the rotor body 3a, thereby mechanically reinforcing the joint part. The thickness of the stiffening member 10 may also be changed or modified if desired. Furthermore, the connecting location between the stiffening member 10 and the rotor 3 may be changed or modified in such a manner not to interfere the reciprocation of the spool 5. As shown in FIGS. 22 and 23, stiffening member 10 may be attached on each of the outer surfaces of the pair of arms 3b.

The stiffening member 10 may be formed of a plurality of separated members and may be connected to the rotor body 3a at the edge portions of the plurality of separated members.

What is claimed is:

1. A fishing spinning reel comprising:
a rotor having a pair of opposing arms which, at their butt ends, are connected to both sides of a rotor body, wherein one of the pair of arms is provided with, at the forefront end thereof, a supporting member including a fishing line guide;
a spool configured to wind up a fishing line through the fishing line guide, in response to a rotation of the rotor; and
a stiffening member extending from each of fore portions of the pair of the arms towards a rear portion of the rotor body, wherein the stiffening member is formed to be more spaced apart from the pair of the arms as approaching butt ends of the pair of the arms;
wherein a portion of the stiffening member apart from the pair of arms is connected to the rotor body.

2. The fishing spinning reel of claim 1, wherein the stiffening member is formed to be curved convexly towards a reel body between the pair of arms; and
wherein an intermediate portion of the stiffening member is connected to a rear portion of the rotor body.

3. The fishing spinning reel of claim 2, wherein the spool reciprocates along a rotation axis of the rotor in response to a rotation of the rotor; and
wherein at least the intermediate portion of the stiffening member is positioned more rear than a rear edge portion of a skirt of the spool when the spool is moved to a rearmost position.

4. The fishing spinning reel of claim 1, wherein the stiffening member is mounted on opposing lateral surfaces of each of the pair of arm.

5. The fishing spinning reel of claim 1, wherein at least one aperture or notch is formed on the rotor body.

6. The fishing spinning reel of claim 1 further comprising a cap member for covering a clearance defined between the stiffening member and said butt ends of the pair of the arms.

7. The fishing spinning reel of claim 6, wherein the cap member comprises a cylindrical member which is fitted inside the rotor body.

8. The fishing spinning reel of claim 6 further comprising a cover member which is attached to the pair of arms; wherein the cap member is formed integrally with the cover member.

9. A fishing spinning reel comprising:
a rotor having a pair of opposing arms which, at their butt ends, are connected to both sides of a rotor body, wherein one of the pair of arms is provided with, at a forefront end thereof, a supporting member including a fishing line guide;
a spool configured to wind up a fishing line through the fishing line guide, in response to a rotation of the rotor; and
a stiffening member extending from each of fore portions of the pair of the arms towards a rear portion of the rotor body, the stiffening member connecting the fore portions of the pair of the arms, wherein the stiffening member is formed to be more spaced apart from the pair of the arms as approaching butt ends of the pair of the arms; and wherein the stiffening member is formed to be curved convexly towards the reel body between the pair of arms.

10. The fishing spinning reel of claim 9, wherein the stiffening member is mounted on opposing lateral surfaces of each of the pair of arms.

11. The fishing spinning reel of claim 9, wherein at least one aperture or notch is formed on the rotor body.

12. The fishing spinning reel of claim 9, wherein the spool reciprocates along a rotation axis of the rotor in response to a rotation of the rotor; and
wherein at least an intermediate portion of the stiffening member is positioned more rear than a rear edge portion of a skirt of the spool when the spool is moved to a rearmost position.

13. The fishing spinning reel of claim 9 further comprising a cap member for covering a clearance defined between the stiffening member and said butt ends of the pair of the arms.

14. The fishing spinning reel of claim 13, wherein the cap member comprises a cylindrical member which is fitted inside the rotor body.

15. The fishing spinning reel of claim 13 further comprising a cover member which is attached to the pair of arms; wherein the cap member is formed integrally with the cover member.

* * * * *